(12) United States Patent
Nagaike et al.

(10) Patent No.: US 6,758,085 B2
(45) Date of Patent: Jul. 6, 2004

(54) APPARATUS FOR MEASURING A SURFACE PROFILE

(75) Inventors: Yasunari Nagaike, Hachioji (JP); Yasushi Nakamura, Kitatsuru-gun (JP); Yoshiaki Ito, Fuchu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/463,128

(22) Filed: Jun. 17, 2003

(65) Prior Publication Data

US 2003/0217592 A1 Nov. 27, 2003

Related U.S. Application Data

(63) Continuation of application No. PCT/JP02/09058, filed on Sep. 5, 2002.

(30) Foreign Application Priority Data

Sep. 7, 2001 (JP) ........................ 2001-271500

(51) Int. Cl.[7] ............................ G01B 5/28; B23Q 17/20
(52) U.S. Cl. ............................ 73/104; 73/105; 33/503; 33/556; 33/559
(58) Field of Search ........................ 73/104, 105; 33/503, 33/556, 559

(56) References Cited

U.S. PATENT DOCUMENTS

| 3,795,132 | A | * | 3/1974 | Huling et al. ................ 73/105 |
| 4,103,542 | A | | 8/1978 | Wheeler et al. ............... 73/105 |
| 4,168,576 | A | * | 9/1979 | McMurtry ..................... 33/559 |
| 4,391,044 | A | | 7/1983 | Wheeler ....................... 33/561 |
| 4,495,703 | A | * | 1/1985 | Sakata et al. ................. 33/503 |
| 4,679,326 | A | * | 7/1987 | Takizawa et al. ............. 33/832 |
| 5,396,712 | A | * | 3/1995 | Herzog ......................... 33/503 |
| 6,484,571 | B1 | * | 11/2002 | Hidaka et al. ................ 73/105 |

FOREIGN PATENT DOCUMENTS

| FR | 2645638 | 10/1990 |
| JP | 07-260471 | 10/1995 |

* cited by examiner

*Primary Examiner*—Daniel S. Larkin
(74) *Attorney, Agent, or Firm*—Hogan & Hartson LLP

(57) ABSTRACT

An apparatus for measuring a surface profile of an object to be measured includes a measuring probe positioned to contact the surface of the object to be measured, a guide mechanism for supporting and guiding the measuring probe in an axial direction of the measuring probe, a tilt angle adjustment mechanism for tilting the guide mechanism at a predetermined tilt angle with respect to a horizontal direction so that the measuring probe contacts the surface of the object to be measured with a predetermined contact force, and a drive mechanism for relatively driving at least one of the measuring probe and the object to scan the surface of the object to be measured with the measuring probe. The contact force is derived from a tilt direction component of the gravity of the measuring probe generated when the measuring probe is tilted.

8 Claims, 9 Drawing Sheets

APPARATUS FOR MEASURING A SURFACE PROFILE

CROSS-REFERENCE TO RELATED APPLICATIONS

This is a Continuation Application of PCT Application No. PCT/JP02/09058, filed Sep. 5, 2002, which was published under PCT Article 21(2) in English.

This application is based upon and claims the benefit of priority from the prior Japanese Patent Application No. 2001-271500, filed Sep. 7, 2001, the entire contents of which are incorporated herein by reference.

BACKGROUND OF THE INVENTION

1. Field of the Invention

The present invention relates to an apparatus for measuring a surface profile, which has a contact type measuring probe.

2. Description of the Related Art

For example, there is an apparatus disclosed in JPN. PAT. APPLN. KOKAI Publication No. 7-260471, as the conventional example of an apparatus for measuring the surface profile of a object to be measured. The conventional apparatus will be described below with reference to FIG. 12.

The above conventional -apparatus comprises a measuring probe 41 an X-Z coordinate system driving section 42, a coordinate measuring section 43, an input means 44, and control means 45. More specifically, the measuring probe 41 includes a contact needle member 41a, which makes contact with an object to be measured 32 driven in a Y-axis direction by a Y-axis coordinate system driving section 31 provided in a main body 30 of the above apparatus. In this case, the needle member 41a contacts the object 32 to be measured from above. The X-Z coordinate system driving section-42 drives the measuring probe 41 in the X and Z directions, and the coordinate measuring section 43 measures the coordinates of the measuring probe 41. The input means 44 inputs tilt angle information of the contact needle member 41a at a contact measuring point with respect to a surface 32a to be measured. The control means 45 controls the measuring pressure of the measuring probe 41 on the surface of the object to be measured based on the tilt angle information inputted by the input means 44. In this case, the control means 45 controls the contact by the measuring probe 41 so that the sum of contact deformation of the measuring probe 41 and the object 32 to be measured becomes constant in the vertical direction to the surface to be measured 32a.

The conventional apparatus has the above structure, and the tilt angle information at the contact measuring point by the measuring probe 41 on the surface of the object to be measured is input from the input means 44. Based on the tilt angle information thus input, the apparatus can measure the surface profile of the measuring surface 32a of the object 32 to be measured while controlling the measuring pressure of the measuring probe 41 by the control means 45. As described above, the measuring pressure of the measuring probe 41 is controlled, and thereby, vertical contact deformation is always made constant with respect to the surface of the object to be measured. By doing so, it is possible to prevent the generation of a measuring error resulting from changes of the contact deformation.

In the above conventional apparatus, a flat spring or a compression coil is used for controlling the measuring pressure so that the measuring pressure of the measuring probe 41 becomes extremely small, or the contact force always becomes constant on the surface of the object 32 to be measured.

BRIEF SUMMARY OF THE INVENTION

According to a first aspect of the present invention, there is provided an apparatus for measuring a surface profile of an object to be measured, comprising:

a measuring probe positioned to contact the surface of the object to be measured;

guide means for supporting and guiding the measuring probe in an axial direction of the measuring probe;

tilt angle adjustment means for tilting the guide means at a predetermined tilt angle with respect to a horizontal direction so that the measuring probe contacts the surface of the object to be measured with a predetermined contact force, and drive means for relatively driving at least one of the measuring probe and the object to scan the surface of the object to be measured with the measuring probe, the contact force being derived from a tilt direction component of the gravity of the measuring probe generated when the measuring probe is tilted.

Preferably, the tilt angle ranges from 0.0005 to 5°, more preferably from 0.03 to 0.2°. The contact force ranges from 5 to 300 mgf, more preferably from 30 to 90 mgf.

The apparatus has the above structure, and thereby, the contact force of the measuring probe applied to the surface of the object to be measured is derived from the tilt direction component of the gravity of the measuring probe. Therefore, there is no need to take the hysteresis characteristic into consideration. A constant contact force is applied to each point on the surface of the object to be measured. Since the measuring probe is tilted at the predetermined tilt angle by the tilt angle adjustment means, an extremely small contact force can be very readily obtained. Since the extremely small contact force is obtained as described above, the apparatus is a contact type; nevertheless, it is possible to highly accurately measure the surface profile of the object to be measured. Further, it is possible to obtain effects similar to non-destructive measurement of the surface profile of the object to be measured with non-contact.

According to a second aspect of the present invention, there is provided an apparatus for measuring a surface profile of an object to be measured wherein the guide means movably supports the measuring probe, and comprises a guide mechanism to guide the measuring probe with a predetermined frictional force between the guide means and the measuring probe, the frictional force being smaller than the tilt direction component of the gravity of the measuring probe.

According to the present invention, means generating an extremely stall frictional force, for example, a linear guide, preferably, an air slider is used as the guide means. By so doing, since an extremely small contact force is obtained, the apparatus is a contact type; nevertheless, it is possible to highly accurately measure the surface profile of the object to be measured.

According to a third aspect of the present invention, there is provided an apparatus for measuring a surface profile of an object to be measured wherein the tilt angle adjustment means tilts both the measuring probe and the object to be measured at a predetermined tilt angle to the horizontal direction.

According to the present invention, since the tilt angle is applied to both the measuring probe and the object to be measured, when the object is measured, no angle difference is generated between the measuring probe and the object to be measured. Therefore, there is no need to correct the tilt angle, and the apparatus is a contact type; nevertheless, it is possible to highly accurately measure the surface profile of the object to be measured.

According to another aspect of the present invention, there is provided an apparatus for measuring a surface profile of an object to be measured wherein the object to be measured has a predetermined surface roughness Ry and scanning length φ, and when a predetermined contact force $F_\theta$ is applied at the maximum contact angle αmax by the measuring probe, the maximum velocity Vmax of the measuring probe scanning the surface of the object to be measured has a relationship expressed by the following equation:

$$V\text{max} \propto (F_\theta \cdot \phi)/(Ry \cdot \alpha\text{max})$$

According to the present invention, if the object to be measured is formed of a very soft material that is liable to damage when measuring, the contact force $F_\theta$ is made small, and thereby, the object can be measured with the small contact forces $F_\theta$ without being damaged. Conversely, if there is no possibility that the object to be measured will be damaged, the contact force $F_\theta$ is made large, and thereby, the maximum scanning velocity Vmax becomes large. As a result, it is possible to shorten the time for measuring the surface profile of the object to be measured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

The embodiments of the present invention will be described below. In the following embodiments, the X-Y-Z axis orthogonal coordinate system shown in FIG. 1 is used in all embodiments of the present invention, and a negative direction of the Z-axis and a positive direction thereof are defined as the distal end side and the proximal end side, respectively.

First Embodiment

Figure 1:
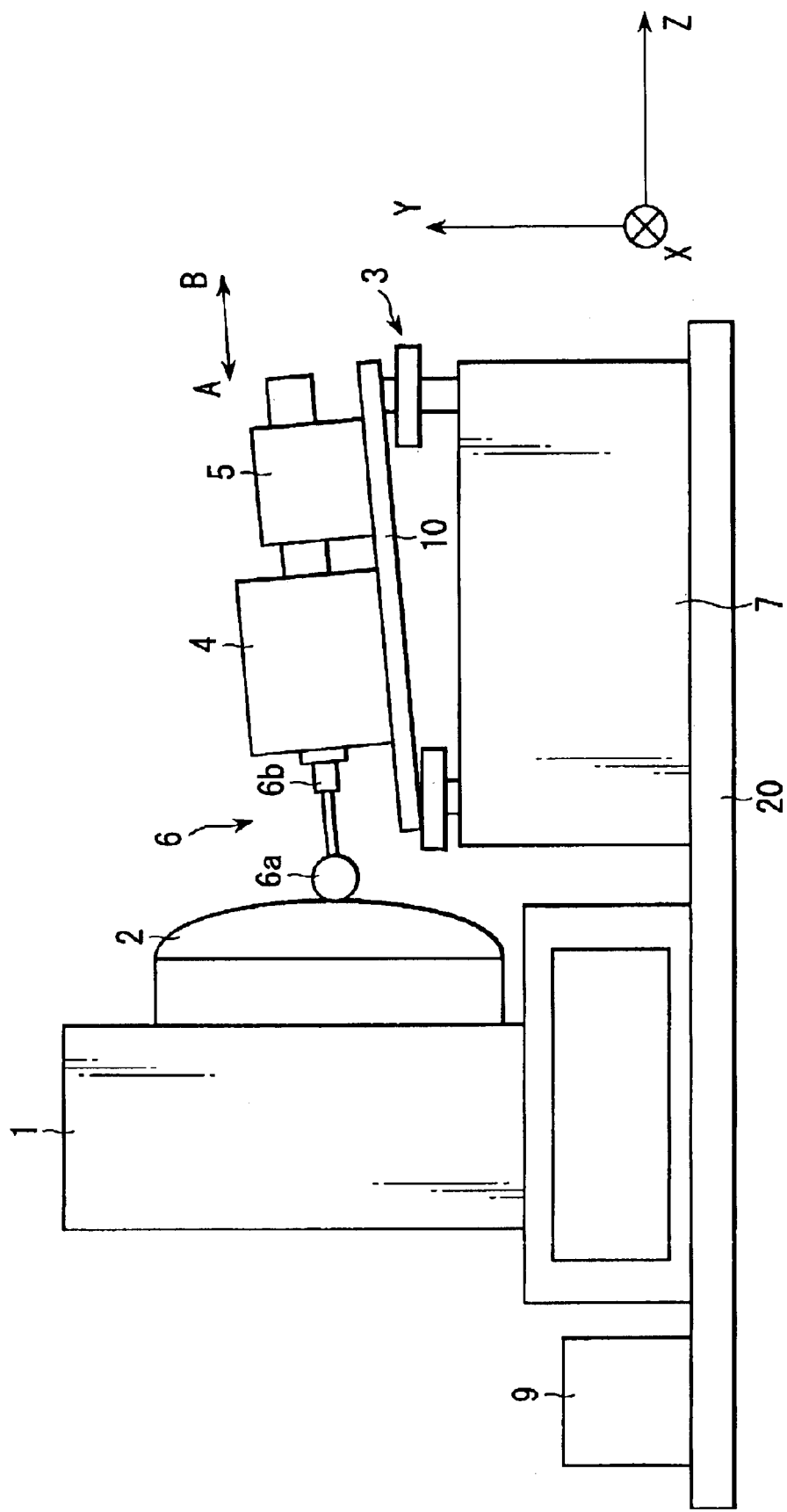
FIG. 1 is a view schematically showing an apparatus for measuring a surface profile according to a first embodiment of the present invention.

In the first embodiment, the apparatus for measuring a surface profile has a flat base portion 20 as shown in FIG. 1. A support member 1 and a table portion 7 are fixed on the base portion 20. The table portion 7 is provided with a mount plate 10 via a tilt angle adjustment means 3. A guide means 4 is attached to the mount plate 10. An object 2 to be measured is supported by the support member 1. A measuring probe 6 is movably supported by the guide means 4 and positioned so as to contact the surface of the object 2 to be measured. First and second position-detecting elements 5 and 9 are provided on the mount plate 10 and the base portion 20, respectively.

Figure 3:
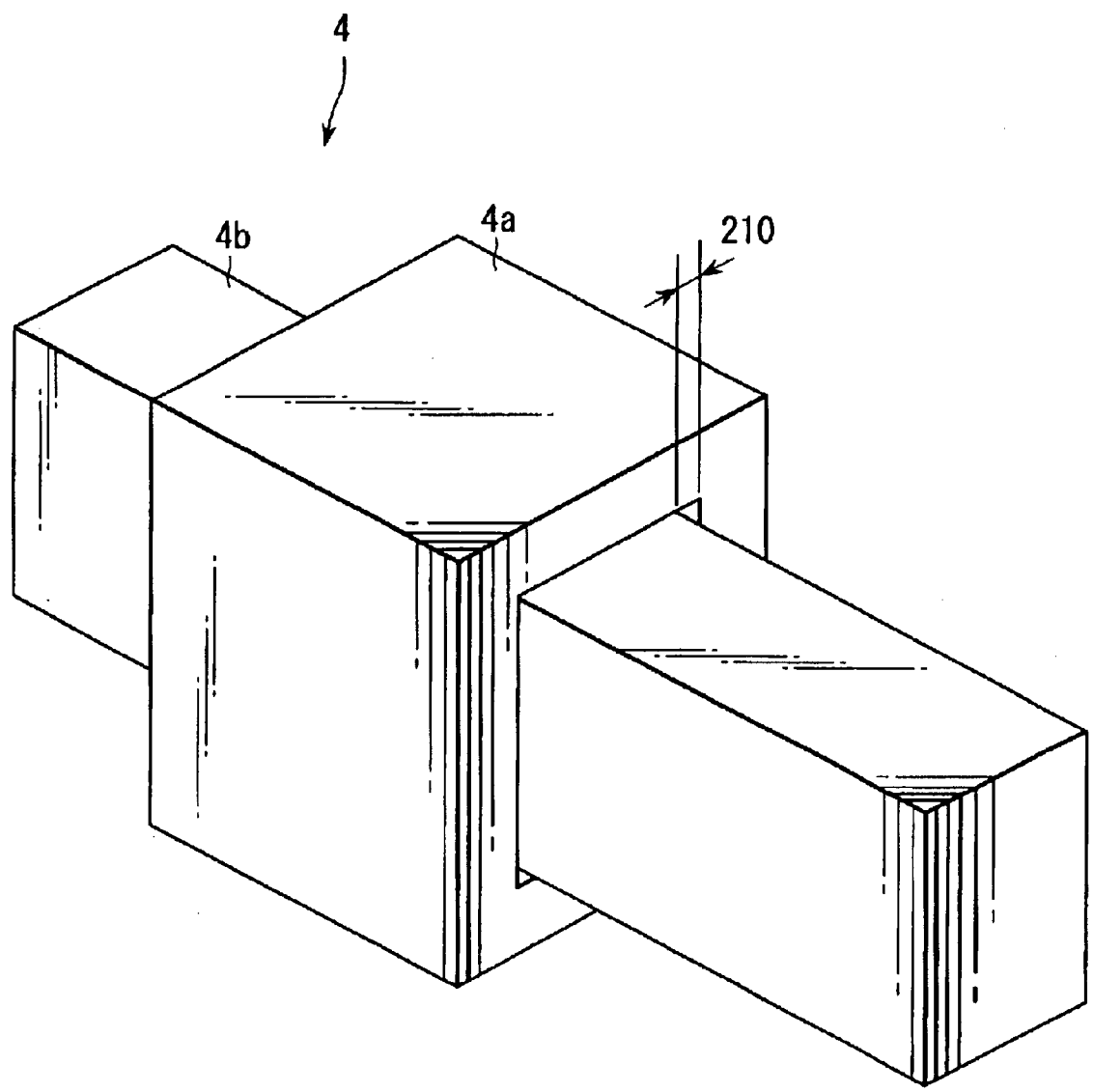
FIG. 3 is a partially enlarged perspective view showing the structure of measuring probe support means.

In the first embodiment, the guide means 4 is an air slider. As illustrated in FIG. 3, the guide means 4 comprises a slider support member 4a and a slider movable member 4b. The slider support member 4a is formed with an opening. The slider movable member 4b penetrates movably the opening of the slider support member 4a, and is floatingly supported. The air slider 4 has an air supply section (not shown), which supplies air to a space 210 between the slider support member 4a and the slider movable member 4b. The space 210 is very narrow, and has a width of 100 μm or less, preferably 20 μm or less. The material of the air slider 4 is ceramic, a metallic material such as iron, or a glass material. The guide means 4 may be a linear guide.

The above measuring probe 6 comprises a cylinder- or prism-shaped trunk member 6b and a sphere- or wedge-shaped contact needle member 6a, which is attached to the distal end of the trunk member 6b. The trunk member 6b of the measuring probe 6 is attached to the slider movable member 4b of the guide means 4, and is movable in the directions of arrow A and B of FIG. 1 integrally with the slider movable member 4b. The contact needle member 6a is positioned so as to contact the surface of the object 2 to be measured.

Figure 2:
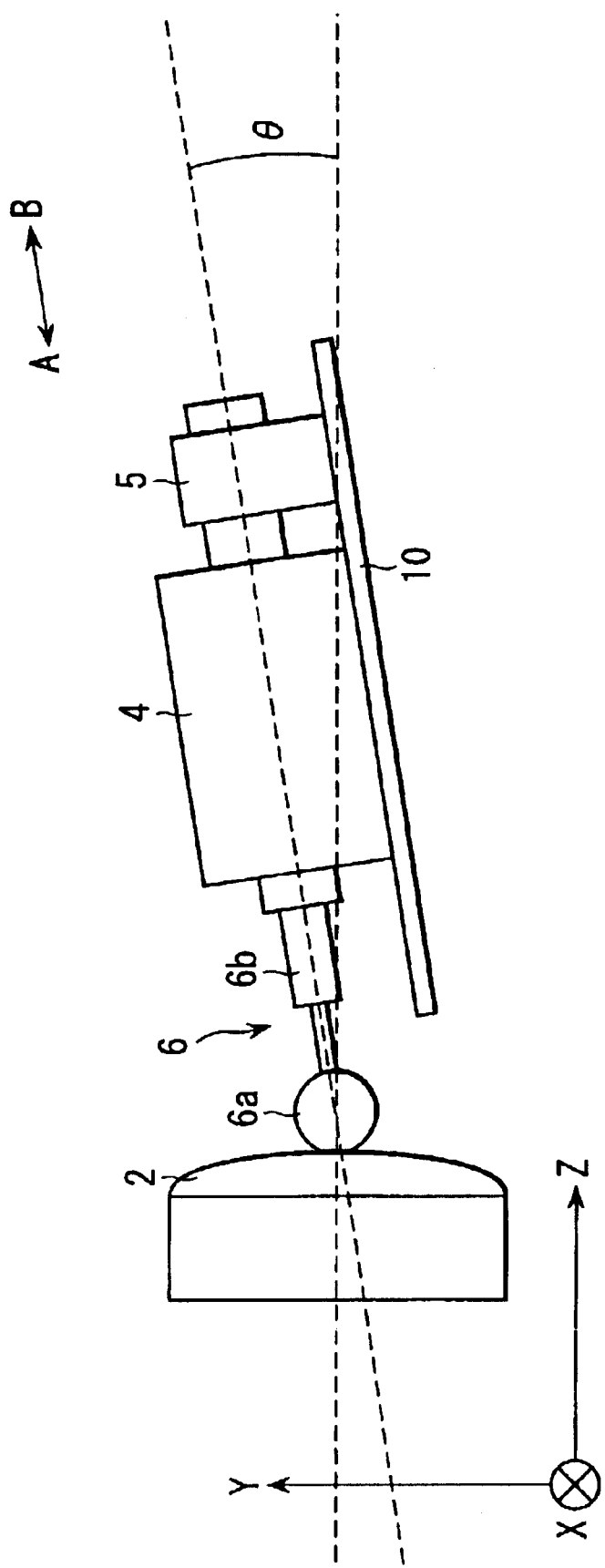
FIG. 2 is a partially enlarged view showing the state in which a contact needle member of a measuring probe makes contact with the surface of an object to be measured at a predetermined tilt angle in the apparatus for measuring a surface profile according to the first embodiment of the present invention.

In this case, the directions A and B shown in FIG. 1 are directions (hereinafter, referred to as tilt directions) tilted at a predetermined tilt angle θ(0 <θ<90°) to the Z direction, as shown in FIG. 2, and are parallel to the axial direction of the measuring probe 6.

In the first embodiment, the first and second position-detecting elements 5 and 9 are optical scales or laser range finders. The first position-detecting element is positioned so as to detect a tilt direction displacement of the measuring probe 6. On the other hand, the second position-detecting element 9 is positioned so as to detect the X-axis direction position of the contact needle member 6a.

Figure 4:
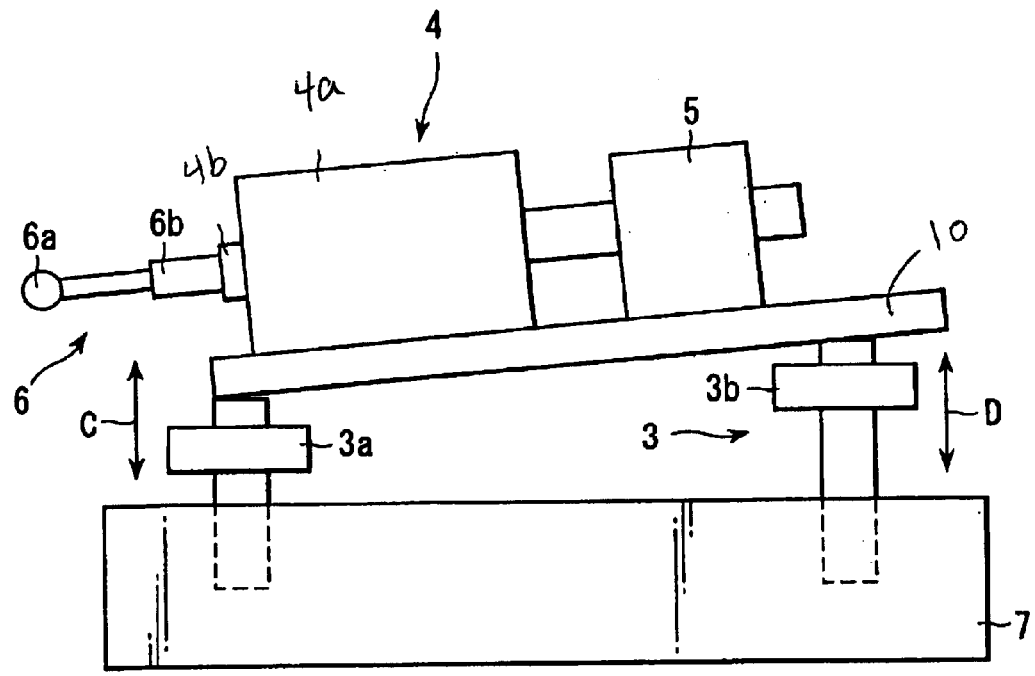
FIG. 4 is a view schematically showing a tilt angle adjustment means in the first embodiment.

As schematically shown in FIG. 4, the above tilt angle adjustment means 3 comprises first and second angle adjustment members 3a and 3b. These angle adjustment members 3a and 3b are individually connected to the table portion 7 at their lower end portions by a screw. Either of the angle adjustment members 3a and 3b is rotatably supported on the mount plate 10 by a joint or a rotatable support member.

At least one of the angle adjustment members 3a and 3b has the following structure movable in the forward and backward directions along arrows C and D parallel to the Y-axis direction so that the mount plate 10 can be tilted to the X-Z plane, that is, the measuring probe 6 can be tilted at a predetermined tilt angle to the Z axis. The above movement is made by mechanical means such as a screw, and may be made by electric means such as a motor. The angle adjustment members 3a and 3b are arranged at the distal and proximal end portions of the mount plate 10 at least one by one, and are operable independently of each other.

More specifically, the first angle adjustment member 3a rotatably supports the mount plate 10 by using a pivot. On the other hand, the second angle adjustment member 3b is provided with a wheel at the upper portion, and is formed with a screw at the lower portion. The second angle adjustment member 3b is adjusted by the screw, and thereby, changed in the Y-axis direction with respect to the table portion 7. In this case, the wheel rotates on the lower surface of the mount plate 10, and thereby, the second angle adjustment member 3b can freely move with respect to the mount plate 10. Therefore, the above two angle adjustment members 3a and 3b cooperate mutually so that the mount plate 10 can be tilted at the predetermined tilt angle. The mount plate 10 is kept in a state of being tilted at the above tilt angle by controlling the screw.

Figure 5:
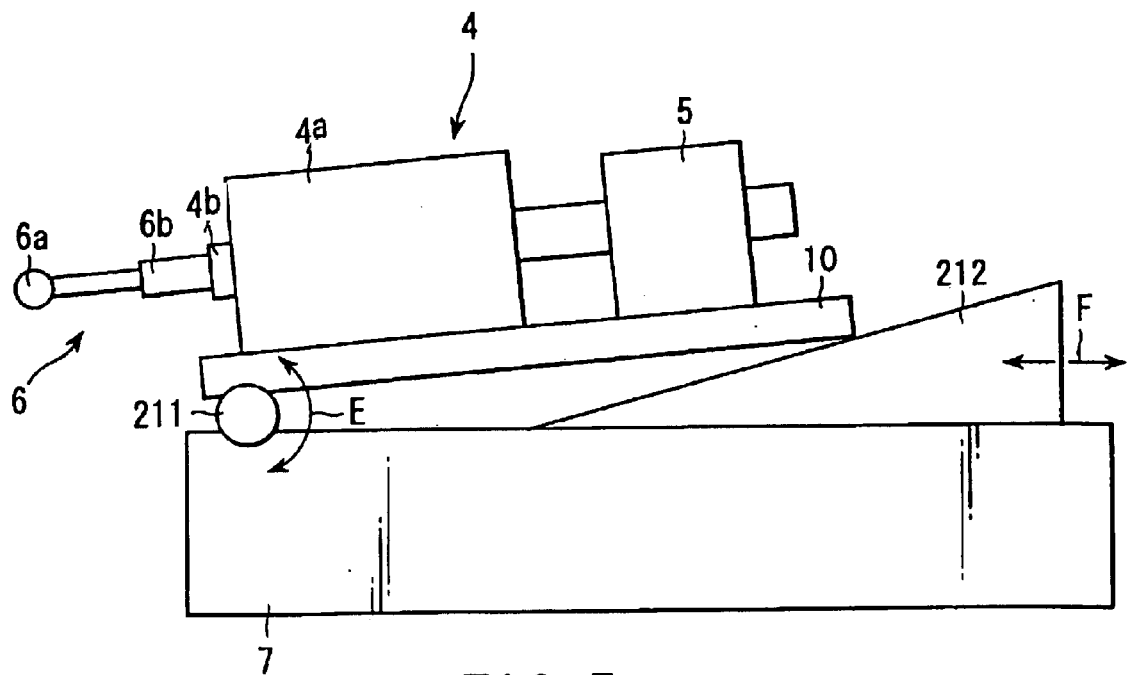
FIG. 5 is a view schematically showing a first modification of the tilt angle adjustment means in the first embodiment.
Figure 6:
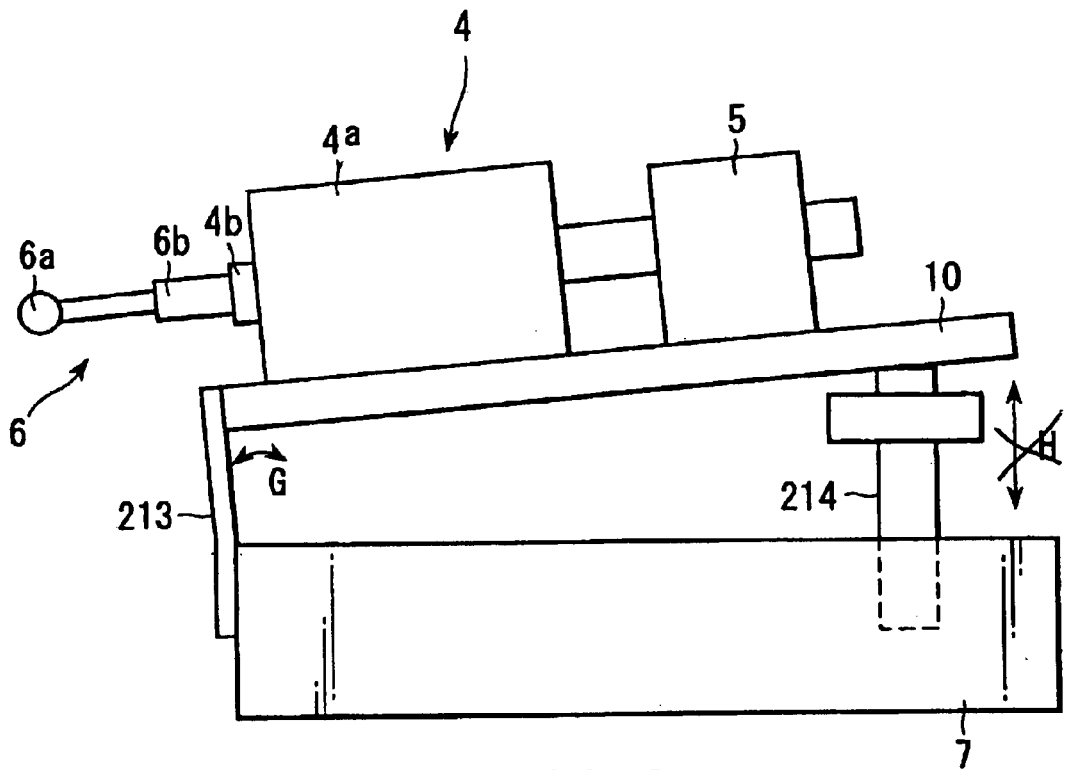
FIG. 6 is a view schematically showing a second modification of the tilt angle adjustment means in the first embodiment.
Figure 7:
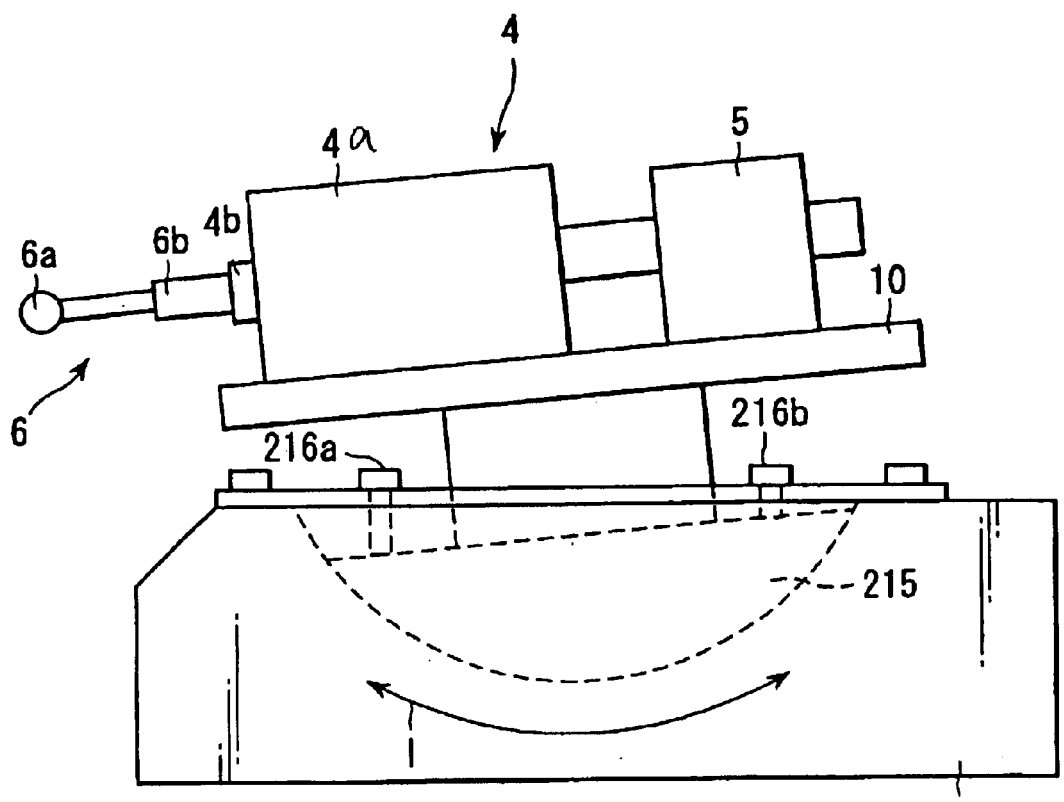
FIG. 7 is a view schematically showing a third modification of the tilt angle adjustment means in the first embodiment.

In FIG. 5 to FIG. 7, there are shown modifications of the tilt angle adjustment means 3. In the first modification shown in FIG. 5, the distal side first angle adjustment member 3a of FIG. 4 comprises a pivotal member 211 having its center axis parallel with the X-axis and a circular cross section. For example, the pivotal member 211 is a rotatably supportable member such as a cylindrical or spherical member. The second angle adjustment member 3b comprises a tilt member 212 having a triangular prism. In this case, the tilt member 212 is inserted with its bevel being oriented to the mount plate 10.

The above two members 211 and 212 cooperate mutually so that the distal side of the mount plate 10 can be made lower than the proximal side thereof. More specifically, the mount plate 10 is supported to move along the bevel of the tilt member 212 so that it can be rotated in the direction of arrow E about the pivotal member 211.

In the first modification shown in FIG. 5, in order to change the tilt angle, the tilt member 212 is moved in the direction of arrow F. The tilt member 212 is fixed by a fixing member (not shown), and thereby the mount plate 10 is kept in a state being tilted at the predetermined angle.

In the second modification shown in FIG. 6, the distal side pivotal member 211 of FIG. 5 comprises a plate-shaped elastic member 213 connected to the mount plate 10 and the table portion 7. The elastic member 213 is a flat spring or the like, for example. A proximal side angle adjustment member 214 may be either the above angle adjustment member 3a or the above tilt member 212. In either case, the mount plate 10 is connected or supported to the proximal side angle adjustment member 214 so that it can be rotated in the direction of arrow G about the plate-shaped elastic member 213.

In the second modification shown in FIG. 6, the operation for changing the tilt angle is basically the same as for the tilt angle adjustment means shown in FIG. 4 or FIG. 5. A tension member (not shown) is interposed on the distal side between the table portion 7 and the mount plate 10, and/or a thrust member (not shown) is interposed on the proximal side therebetween, and thereby, the mount plate 10 is kept in a state of being tilted at the tilt angle.

In the third modification shown in FIG. 7, the tilt angle adjustment means 3 comprises a tilt-generating member 215 having a circumferential or spherical surface, and a recess portion. The recess portion has a shape complementary to the circumferential or spherical surface of the tilt-generating member 215, and is formed on the upper surface of the table portion 7. In order to change the tilt angle, the tilt-generating member 215 is rotated in the direction of arrow I. Fixing members 216a and 216b are abutted against the upper surface of the tilt-generating member 215, and thereby, the mount plate 10 is kept in a state of being tilted at the tilt angle. A gonio-stage may be used in place of the above fixing members 216a and 216b.

The above four type of the tilt angle adjustment means 3 shown in FIGS. 4–7 may be properly combined. The mount plate 10 may be tilted integrally with the guide means 4 and the position-detecting element 5 attached thereto by the tilt angle adjustment means 3. Further, the tilt angle adjustment means 3 is not limited to the above description.

As described above, the measuring probe 6 is supported by the guide means 4, and is tilted at an extremely small tilt angle to the Z-axis direction (see FIG. 2). Further, the measuring probe 6 is positioned so as to contact the surface of the object 2 to be measured with a predetermined contact force by the tilt direction component of the gravity of the contact needle member 6a generated by the tilt. That is, the apparatus for measuring a surface profile according to the present invention is configured so that the contact force can be proportionally changed in accordance with the preset tilt angle θ of the measuring probe 6.

Figure 8:
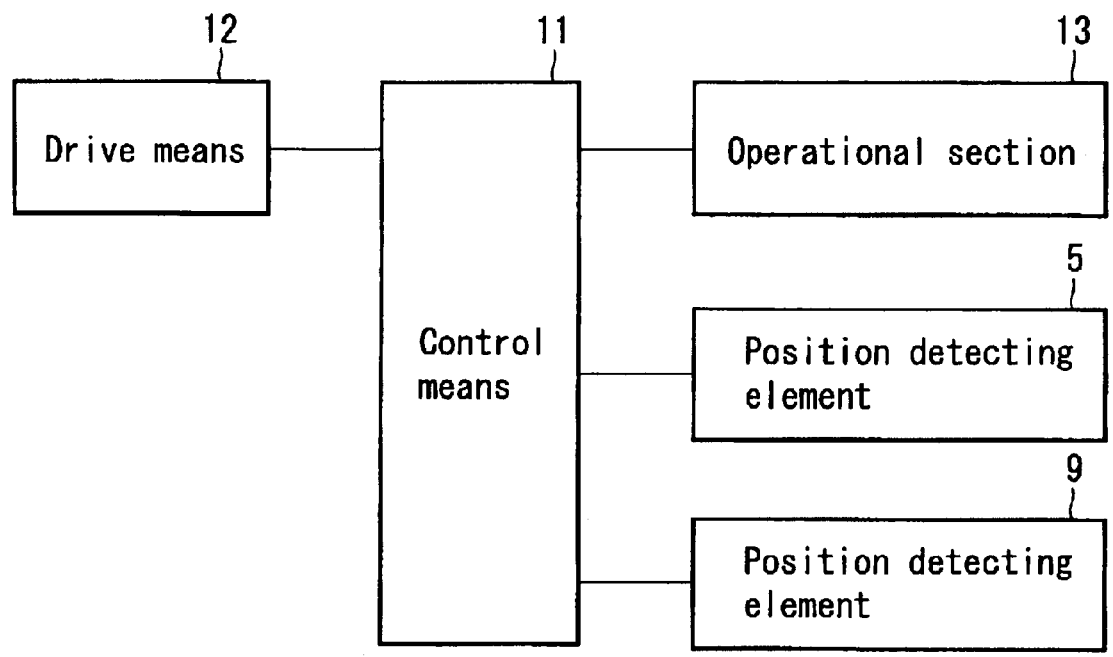
FIG. 8 is a block diagram showing a control system of the apparatus for measuring a surface profile according to the present invention.

FIG. 8 is a block diagram schematically showing a control system for controlling the apparatus for measuring a surface profile according to the first embodiment. The control system has a control means 11 for controlling the whole of the apparatus for measuring a surface profile. The control means 11 is a motor or piezoelectric actuator, for example. The control means 11 is configured to control the first and second position-detecting elements 5, 9 and a drive means 12 for driving the above object 2 to be measured to the X-axis direction. Further, the control means 11 is connected to an operational section 13 described later, which executes operational processing.

The operation of the apparatus having the above structure is described below.

As seen from FIG. 1 and FIG. 2, in the apparatus having the above structure, the tilt angle adjustment means 3 is operated, and thereby, the predetermined angle θ to the Z-axis direction is applied to the air slider 4 attached to the mount plate 10. As described before, the air slider 4 cooperates with the measuring probe 6. The slider movable member 4b moves in the direction of arrow A through the slider support member 4a by the tilt direction component of the gravity of the measuring probe 6. In this manner, the contact needle member 6a of the measuring probe 6 contacts the surface of the object 2 to be measured. The object 2 to be measured is not limited, and for example, may be a lens, metal mold, or optical element.

Since air is supplied to the space 210 between the slider support member 4a and the slider movable member 4b, the frictional force f between these members depends on the viscosity coefficient τ of the air supplied. In general, the frictional force of the air is about 1/1000 of the frictional force of ordinary lubricating oil. Therefore, a measurement using the air slider 4 can be carried out at a tilt angle θ much smaller compared with measurement using a hydrostatic slider. Measurements using the air slider 4 do not require a structure relevant to lubricating oil, so that the measuring apparatus can be made compact as a whole.

In the apparatus for measuring a surface profile, the contact force $F_\theta$ of the contact needle member 6a on the surface of the object 2 to be measured depends on the tilt direction component of the gravity acting on the measuring probe 6 and the frictional force f. In this case, when the tilt angle is set as θ and the gravity of the measuring probe 6 acting on the contact needle member 6a is set as F=mg, the contact force $F_\theta$ is expressed by the following equation:

$$F_\theta = F \cdot \sin\theta - f = mg \cdot \sin\theta - f$$

In the first embodiment, the air slider is used, and the frictional force is expressed by the following equation of f=τmg. The frictional force f is much smaller in fact, and can be disregarded. Therefore, the contact force is expressed by the following equation of $F_\theta = mg \cdot \sin\theta$.

Figure 9:
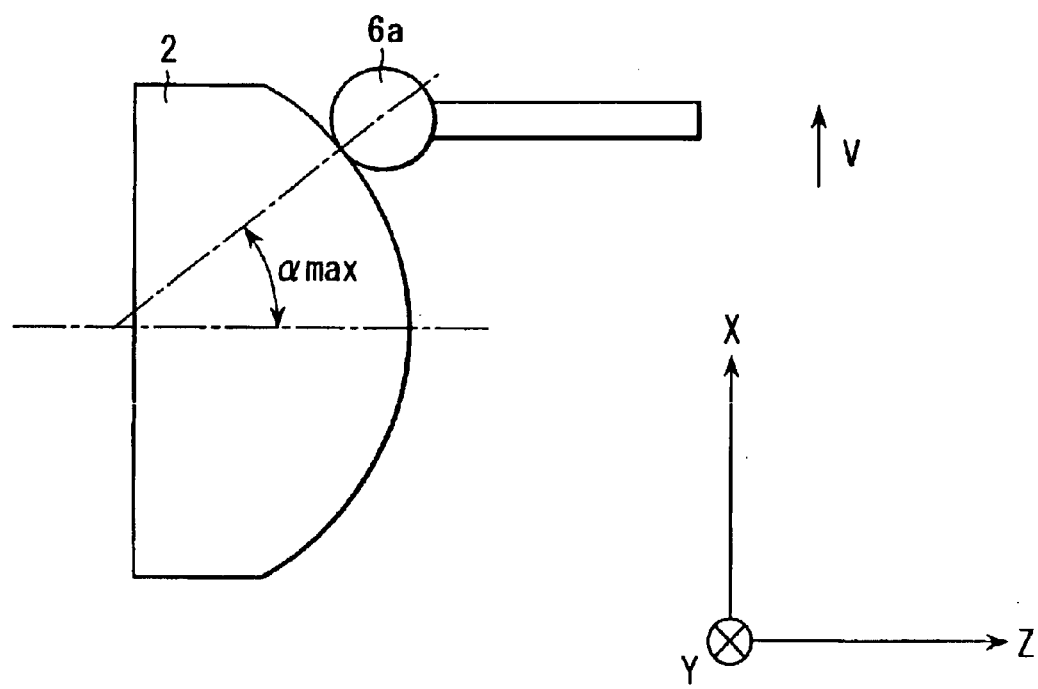
FIG. 9 is a partially enlarged top plan view showing the state in which the contact needle member of the measuring probe contacts the object to be measured.

When making the actual measurement, in addition to the above contact force $F_\theta$, the following factors influence. The factors are the relative maximum scanning velocity Vmax in the X-axis direction of the apparatus and the object to be measured, a surface roughness Ry of the object to be measured, a scanning length φ of the object to be measured, and the maximum contact angle αmax (see FIG. 9). These factors have the following relationship.

$$V_{max} \propto (F_\theta \cdot \phi)/(Ry \cdot \alpha_{max})$$

That is, the larger the contact force $F_\theta$ is, or the larger the scanning length φ of the object to be measured is, the larger the maximum scanning velocity Vmax becomes. Conversely, the larger the surface roughness Ry is, or the larger the maximum contact angle αmax is, the smaller the maximum scanning velocity Vmax becomes.

The maximum scanning velocity Vmax is also affected by vibration applied to the support member 1 and the base portion 20 during measurement. If the base portion 20 is placed on a vibration-proofing table, vibration from the outside is prevented or reduced; therefore, it is possible to make measurement at the maximum relative scanning velocity which is comparatively large Vmax.

If the object 2 to be measured is formed of a very soft material that is liable to be damaged by measurement, the contact force Fe is made small, and thereby, the object to be measured can be measured without receiving damage. Conversely, if there is no possibility that the object 2 to be measured will be damaged, the contact force $F_\theta$ is made large, and thereby, the maximum scanning velocity Vmax becomes large. As a result, it is possible to shorten the time for measuring the surface profile of the object 2 to be measured.

As described above, since the relation of $F_\theta = mg \cdot \sin\theta$ is given, the maximum scanning velocity Vmax is proportional to the self-weight m of the measuring probe 6. Further, since the relation of 0<θ<90° is given, the maximum scanning velocity Vmax is proportional to the tilt angle θ, likewise. In other words, at least one value of the self-weight m of the measuring probe 6 and the tilt angle θ is made large, and thereby, a large value for the maximum scanning velocity Vmax can be obtained.

Therefore, even if a light measuring probe 6 is used so that the contact force Fθ can be set to a relatively small value, the tilt angle is increased as the need arises, and thereby, it is possible to instantaneously increase large the contact force Fθ, that is, the maximum scanning velocity Vmax. More specifically, if the self-weight m of the measuring probe 6 is set to 3.5 g, the tilt angle θ is set to 4.9°, and thereby, a contact force Fθ of 300 mgf can be obtained.

Conversely, even if a heavy measuring probe 6 is used so that the contact force Fθ can be set to a relatively large value, the tilt angle is decreased as the need arises, and thereby, it is possible to instantaneously decrease the contact force Fθ, that is, the maximum scanning velocity Vmax. Therefore, it is possible to carry out measurements capable of preventing or reducing damage to the object 2 to be measured. More specifically, if the self-weight m of the measuring probe 6 is set to 500 g, the tilt angle θ is set to 0.00057°, and thereby; a contact force Fθ of 5 mgf can be obtained.

The self-weight m of the measuring probe 6 is adjustable by mounting a weight between the guide member 4 and the trunk member 6b.

As seen from the above description, the apparatus of the present invention has a structure in which the value of the contact force Fθ is changeable by only the tilt angle θ of the measuring probe 6. Therefore, a suitable measurement can be instantaneously taken in accordance with the characteristics of the object 2 to be measured. Measurements can be effectively carried out.

The support member 1 supporting the object 2 to be measured is driven in the X-axis direction by the drive means 12 such as a motor or piezoelectric actuator. The contact needle member 6a of the measuring probe 6 scans the object 2 to be measured along the surface profile of the object 2 to be measured in the X-axis direction. In the above operation, the tilt direction displacement of the contact needle member 6a is equivalent to the depth of the surface profile of the object 2 to be measured. The positional information of the contact needle member 6a is detected by the first position-detecting element 5.

The tilt direction displacement of the contact needle member 6a is a relative displacement of the apparatus and object 2 to be measured. Therefore, at least one of the apparatus of the object 2 to be measured is moved relative to each other, and thereby, surface profile data of the object 2 to be measured is obtained.

The scanning in the x-axis direction is carried out using a guide member (not shown) such as a precise hydrostatic slide employing a gas such as air or a liquid such as oil. The guide member is driven by driving devices such as a DC motor, servomotor, linear motor, stepping motor, piezoelectric actuator or voice coil motor. Vibration generated by the driving device is prevented in the following manner. That is, the driving device and the second position-detecting element 9 are positioned in a state of being separated from each other, or a vibration-less driving system by current control is employed. Moreover, the vibration from the outside is prevented in the following manner. That is, the whole of the apparatus is placed on the vibration-proofing table.

In the above structure, since the measured value 1 is that in the tilt direction, the tilt angle θ must be corrected to obtain the data of the actual surface profile (asperity) of the object 2.

As to the tilt angle θ of the measuring probe 6 to the Z-axis direction, the measured value 1 of the first position-detecting element 5 is multiplied by cos θ, and thereby, a correction value L of the actual surface profile of the object 2 to be measured is obtained. In the first embodiment, the operational section 13 makes the operation of L=1·cos θ. The measured value 1 is changed into the correction value L by the operation. The X-direction position data of the object 2 is detected by the second position-detecting element 9. The correction value L and the X-direction position data are plotted in the form of a graph, and thus, the surface profile of the object 2 to be measured is measured.

According to the above first embodiment, the tilt angle adjustment means 3 is controlled, and thereby, the contact force Fθ of the measuring probe 6 on the object 2 to be measured can be very readily adjusted. Therefore, since an extremely small contact force Fθ is obtained, the apparatus for measuring a surface profile is the contact type; nevertheless, it is possible to obtain effects similar to non-destructive measurements of the object 2 to be measured with non-contact.

Second Embodiment

Figure 10:
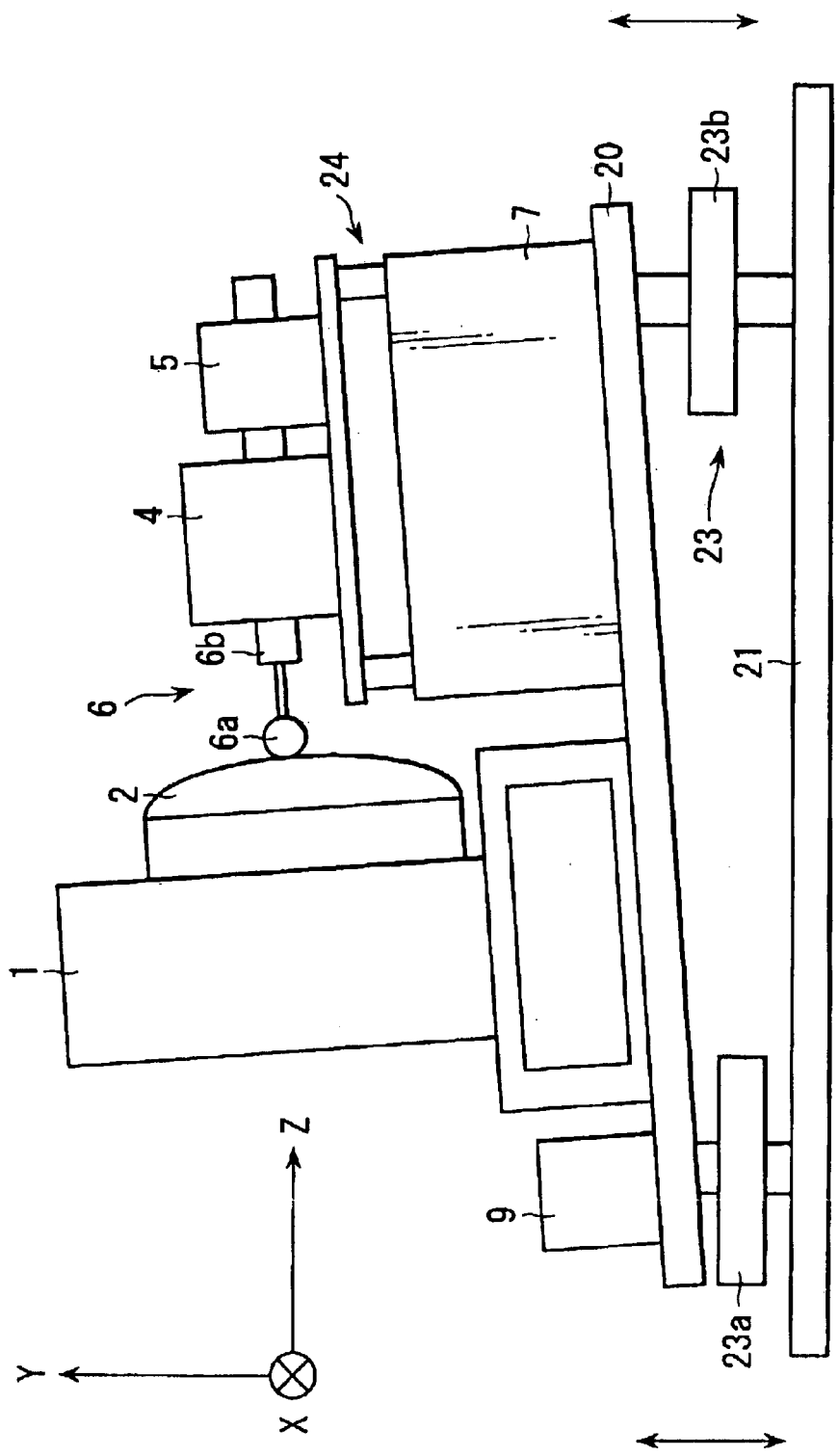
FIG. 10 is a view schematically showing an apparatus for measuring a surface profile according to a second embodiment of the present invention.

The second embodiment of the present invention will be described below with reference to FIG. 10. FIG. 10 is a view schematically showing an apparatus for measuring a surface profile according to the second embodiment of the present invention. In the second embodiment, like reference numerals are used to designate the same members as in the first embodiment.

The apparatus according to the second embodiment has a flat floor base portion 21. The above base portion 20 is provided on the floor base portion 21 via a tilt angle adjustment means 23. The tilt angle adjustment means 23 comprises a plurality of angle adjustment members 23a and 23b, and is functionally equivalent to the tilt angle adjustment means 3 of the first embodiment including the above modifications. The remaining structure of the apparatus shown in FIG. 10 is the same as in the first embodiment except that a fixing member 24 is used in place of the tilt angle adjustment means 3. That is, a predetermined tilt angle θ to the horizontal direction can be applied to all of the following members. More specifically, the members are the table portion 7, the measuring probe 6 on the mount plate 10, the support member 1 supporting the object 2 to be measured, and the first and second position-detecting elements 5 and 9.

The operation of the same members is basically the same as in the first embodiment. The principle that the measuring probe 6 measures the surface profile of the object 2 to be measured is the same as in the first embodiment.

According to the above second embodiment, the tilt angle adjustment means 23 gives the same tilt angle θ to the measuring probe 6 and the object 2 to be measured supported by the support member 1. Therefore, the apparatus according to the second embodiment can obtain the same effects as the apparatus according to the first embodiment. Further, there is no need to correct the tilt angle θ to the measured value 1 of the first position-detecting element 5; therefore, the actual surface profile data L can be directly measured.

Third Embodiment

Figure 11:
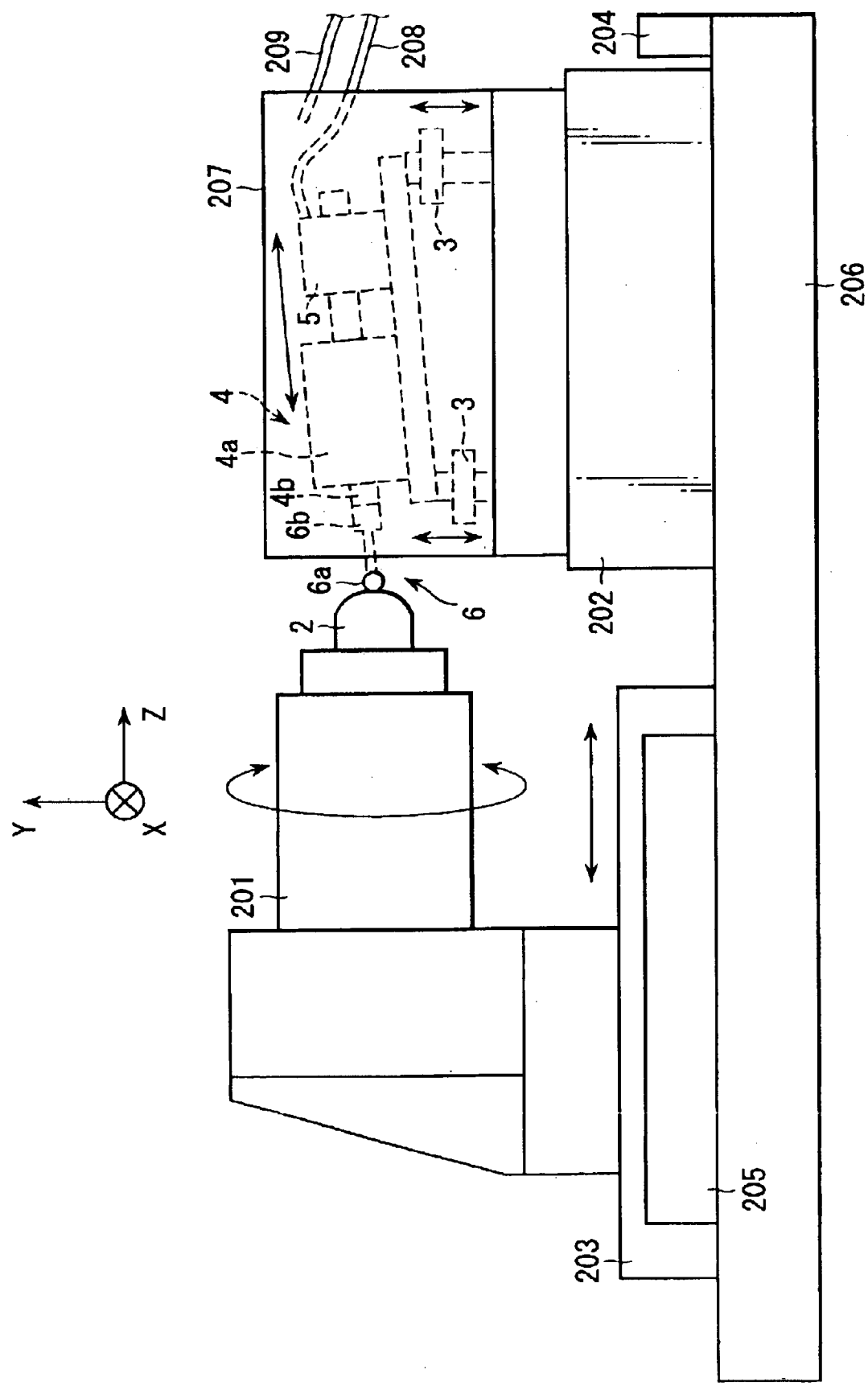
FIG. 11 is a view schematically showing an apparatus for measuring a surface profile according to a third embodiment of the present invention.
Figure 12:
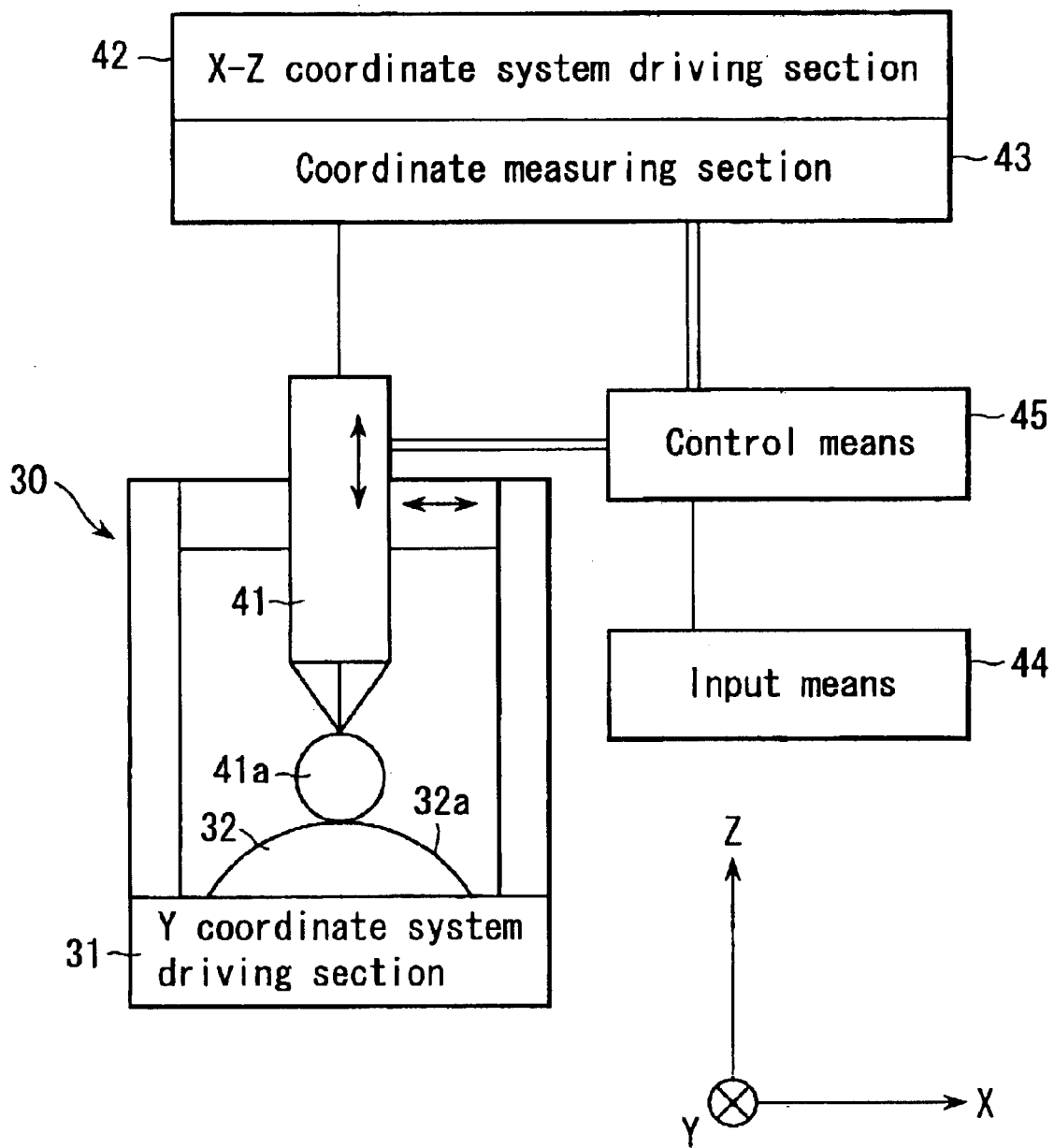
FIG. 12 is a view schematically showing a conventional apparatus for measuring the surface profile of a object to be measured.

The third embodiment of the present invention will be described below with reference to FIG. 11. FIG. 11 is a view schematically showing an apparatus for measuring a surface profile according to the third embodiment of the present invention. In the third embodiment, like reference numerals are used to designate the same members as in the first embodiment. Further, in the third embodiment, the apparatus is mounted on a working machine for machining a lens, metal mold, or optical element.

The above working machine has a machine base 206. The machine base 206 is provided with an X-axis position-detecting element 204 for detecting X-axis movement, and a Z-axis position-detecting element 205 for detecting Z-axis movement. Further, the machine base 206 is provided with a Z-axis movable member 203 and an X-axis movable member 202. The Z-axis movable member 203 is positioned to cooperate with the Z-axis position-detecting element 205. The X-axis movable member 202 moves in the X-axis direction and supports the apparatus for measuring a surface profile. A workpiece rotating member 201 for rotatably supporting the object 2 to be measured is attached to the Z-axis movable member 203. The object 2 to be measured supported by the workpiece rotating member 201 and the measuring probe 6 are positioned so that they can be moved relative to each other in the X-axis direction by the X-axis movable member 202 while being moved relative to each other in the Z-axis direction by the Z-axis movable member 203.

The working machine having the above structure can machine the object 2 to be measured into a desired profile, using machining tools (not shown) such as a turning tool, grindstone member or polishing member.

The apparatus for measuring a surface profile is basically the same structure as in the first embodiment. However, the apparatus is entirely covered with a cover 207. The cover 207 is formed with an opening (not shown) at the distal end side. The measuring probe 6 of the apparatus projects outside the cover 207 through the above opening, and the contact needle member 6a of the measuring probe 6 is positioned so as to contact the object 2 to be measured supported by the workpiece rotating member 201.

Further, the cover 207 is formed with another opening at the proximal end side. This other openings are used for inserting a cable 208 of the first position-detecting element 5 and a purge air supply hose 209 for making positive the internal pressure of the cover 207.

The operation of the, same members is basically the same as in the first embodiment. The principle that the measuring probe 6 measures the surface profile of the object 2 to be measured is the same as in the first embodiment.

In the third embodiment, since the apparatus for measuring a surface profile is entirely covered with the cover 207, it is possible to prevent mist of working fluid and/or dust such as chip powder of the workpiece from adhering thereto during machining of the object 2 to be measured. Since the internal pressure of the cover 207 is made positive by the purge air supply hose 209, it is possible to prevent the mist and/or dust from coming into the cover 207.

According to the above third embodiment, since the apparatus for measuring a surface profile according to the first embodiment is mounted on the working machine, it is possible to measure the surface profile of the object 2 to be measured on the working machine. Therefore, even if the process for measuring the surface profile and the process for machining the object 2 to be measured are alternately carried out, it is possible to measure and evaluate the object 2 to be measured without detaching and attaching it. Further, it is possible to reduce the measuring error due to the above detachment/attachment and the change of measuring environment. Further, it is possible to save the adjusting time of the apparatus due to the above detachment/attachment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for measuring a surface profile of an object to be measured comprising:
   a measuring probe positioned to contact the surface of the object to be measured;
   guide means for supporting and guiding the measuring probe in an axial direction of the, measuring probe;
   tilt angle adjustment means for tilting the guide means at a predetermined tilt angle with respect to a horizontal direction so that the measuring probe contacts the surface of the object to be measured with a predetermined contact force; and
   drive means for relatively driving at least one of the measuring probe and the object to scan the surface of the object to be measured with the measuring probe, the contact force being derived from a tilt direction component of the gravity of the measuring probe generated when the measuring probe is tilted.

2. An apparatus according to claim 1, wherein the guide means movably supports the measuring probe, and comprises a guide mechanism to guide the measuring probe with a predetermined frictional force between the guide means and the measuring probe, the frictional force being smaller than the tilt direction component of the gravity of the measuring probe.

3. An apparatus according to claim 1, wherein the tilt angle adjustment means tilts both the measuring probe and the object to be measured at a predetermined tilt angle to the horizontal direction.

4. An apparatus according to claim 1, wherein the tilt angle ranges from 0.0005 to 5°.

5. An apparatus according to claim 1, wherein the contact force ranges from 5 to 300 mgf.

6. An apparatus according to claim 1, wherein the tilt angle adjustment means is capable of arbitrarily adjusting the angle.

7. An apparatus according to claim 1, wherein the object to be measured has a predetermined surface roughness Ry and scanning length $\Phi$, and when a predetermined contact force $F_\theta$ is applied at the maximum contact angle $\alpha max$ by the measuring probe, the maximum velocity Vmax of the measuring probe scanning the surface of the object to be measured has a relationship expressed by the following equation:

$$V max \propto (F_\theta \cdot \Phi)/(Ry \cdot \alpha max)$$

8. An apparatus for measuring a surface profile of an object to be measured comprising:
   a measuring probe positioned to contact the surface of the object to be measured;
   a supporting mechanism for supporting the measuring probe so that the measuring probe is movable in its axial direction;
   a tilt angle adjustment mechanism for tilting the supporting mechanism at a tilt angle with respect to a horizontal direction so that the measuring probe contacts the surface of the object to be measured with a contact force; and
   a drive mechanism for relatively driving the measuring probe and the object to scan the surface of the object to be measured with the measuring probe,
   the contact force being derived from a tilt direction component of the gravity of the measuring probe generated when the measuring probe is tilted.

* * * * *